United States Patent
Schmidt et al.

(10) Patent No.: US 7,402,036 B2
(45) Date of Patent: Jul. 22, 2008

(54) NOZZLE CONTACT DEVICE

(75) Inventors: Holger Schmidt, Bad Frankenhausen (DE); Donald Meinert, Langenroda (DE); Frank Stengel, Rossleben (DE)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 11/352,823

(22) Filed: Feb. 13, 2006

(65) Prior Publication Data

US 2006/0127528 A1    Jun. 15, 2006

Related U.S. Application Data

(63) Continuation of application No. PCT/EP2004/006758, filed on Jun. 23, 2004.

(30) Foreign Application Priority Data

Aug. 14, 2003   (DE) ................. 103 37 785

(51) Int. Cl.
    *B29C 45/00*    (2006.01)
(52) U.S. Cl. ........................ 425/574; 425/150
(58) Field of Classification Search .......... 425/550, 425/574, 575, 587, 150
    See application file for complete search history.

(56) References Cited

U.S. PATENT DOCUMENTS

| 3,464,091 A | * | 9/1969 | Friedrich ............... 425/574 |
| 3,981,662 A | * | 9/1976 | Bielfeldt et al. ......... 425/550 |
| 4,676,730 A | * | 6/1987 | Yamasaki ............... 425/569 |
| 4,863,368 A | | 9/1989 | Hehl |
| 6,524,095 B1 | | 2/2003 | Ito et al. |
| 2003/0108639 A1 | | 6/2003 | Provencher et al. |

FOREIGN PATENT DOCUMENTS

| DE | 69 42 324 U | 7/1970 |
| EP | 0193 617 A1 | 9/1986 |
| EP | 0 576 925 A | 1/1994 |
| EP | 0 983 835 A | 3/2000 |
| FR | 1 525 249 A | 10/1968 |
| JP | 63 056419 | 3/1988 |
| JP | 02 219620 A | 9/1990 |
| JP | 06-226801 | 8/1994 |
| JP | 9-277306 | 10/1997 |
| JP | 10 202689 A | 8/1998 |
| WO | WO 01/85425 A | 11/2001 |

* cited by examiner

*Primary Examiner*—Yogendra Gupta
*Assistant Examiner*—Maria Veronica D Ewald
(74) *Attorney, Agent, or Firm*—Henry M. Feiereisen; Ursula B. Day

(57) ABSTRACT

A nozzle contact device for guiding and clamping the injection nozzle for an injection unit of an injection molding machine onto an injection mold includes a linear drive for moving the injection unit back and forth, and a guide carriage which can be driven by the linear drive, with the guide carriage being articulated to the injection unit. The invention is characterized in that the axis of rotation of the articulation between the guide carriage and the injection unit extends horizontally, and that this axis of rotation and the injection axis are arranged on planes which are parallel to each other, preferably on the same horizontal plane. Rotary joints or flexural joints can be provided. In addition, the rear part of the injection unit, in particular a screw mechanism can be height-adjustable. As a result, the nozzle contact force is introduced into the injection unit in the absence of a bending moment. No tilting is caused between the injection nozzle and the sprue bush of the injection mold.

17 Claims, 8 Drawing Sheets

NOZZLE CONTACT DEVICE

CROSS-REFERENCES TO RELATED APPLICATIONS

This application is a continuation of prior filed copending PCT International application no. PCT/EP2004/006758, filed Jun. 23, 2004, which designated the United States and on which priority is claimed under 35 U.S.C. §120, and which claims the priority of German Patent Application, Serial No. 103 37 785.9, filed Aug. 14, 2003, pursuant to 35 U.S.C. 119(a)-(d), the content(s) of which is/are incorporated herein by reference.

BACKGROUND OF THE INVENTION

The present invention relates, in general, to a nozzle contact device for guiding and clamping of the injection nozzle of an injection unit of an injection molding machine.

Nothing in the following discussion of the state of the art is to be construed as an admission of prior art.

European Patent Application No. EP 0193617 A1 discloses a nozzle contact device having an injection unit mounted to a guide carriage which can be driven by a subjacent screw mechanism as linear drive. The injection unit is articulated by a vertical rotary pin to the guide carriage so as to be able to laterally swing outwardly in relation to the injection axis, for assembly or maintenance works for example. The screw mechanism includes a ball-screw shaft which has one end rotatably but axially immovably supported in bearings which are secured on the fixed platen. The other end of the screw shaft is connected via a coupling with the output shaft of a motor for the rotary drive of the screw shaft. A ball nut rotatably engages the ball-screw shaft and is supported non-rotatably on the support surface for the injection unit. A spring is arranged between the ball nut and a spring plate, which is secured on the support surface for the injection unit. As the ball-screw shaft rotates, the ball nut and thus the injection unit is able to move to and away from the fixed platen. The nozzle contact pressure can be adjusted via the spring constant and the degree of compression that the spring undergoes. This nozzle contact device is disadvantageous because of the asymmetric force introduction into the nozzle tip and thus into the fixed half of the injection mold and from there into the fixed platen. This results in a comparably significant bending moment, causing inclination of the fixed platen and the attached fixed half of the injection mold. As a consequence, the vertical disposition of the nozzle in relation to the sprue bush of the injection mold changes in dependence on the nozzle contact pressure. At higher contact pressures, the nozzle does not snugly fit upon the sprue bush. Thus, the nozzle contact pressure must generally be limited to prevent leakage between the nozzle and the sprue bush.

An attempt to address this problem is disclosed in Japanese Pat. No. JP 9-277306 which describes a nozzle contact device having two ball-screw shafts on a plane with the injection axis on both sides of the injection unit. Such a nozzle contact device has, however, the drawback that both ball nuts must be operated in synchronism to prevent the injection unit from moving out of the injection axis so that a lateral bending moment is ultimately still generated. A further drawback resides in the fact that the assembly and maintenance of the plasticizing cylinder is made difficult as a lateral swing-out motion is not possible via a vertical rotary pin, and a preceding dismantling of at least one ball-screw shaft is required.

U.S. Pat. No. 6,524,095 B1 discloses a nozzle contact device for an injection molding machine, whereby the injection unit is mounted on a guide carriage which can be driven by a screw mechanism as linear drive and to further articulate the injection unit by means of a vertical rotary pin to the guide carriage so as to be able to swing out laterally in relation to the injection axis. The ball screw and the bearing device of the ball-screw shaft, respectively, are fixed onto the fixed platen via a particularly configured connection piece. This connection piece has a horizontal part which is supported by the machine bed on two guide rails on both sides of the centrally disposed ball-screw shaft. The bearing device for the ball-screw shaft is secured below this horizontal part or forms an integral component of this part. Extending from this horizontal part are two vertical webs in parallel relationship to the platen, at a level of the injection axis, and bolted there to the platen. The bolts are disposed on both sides of the injection axis on one plane therewith. The bolted connection is, however, not tight but loose and in a manner that, on one hand, the bores in the webs have a slightly greater diameter than the bolts, and, on the other hand, sleeves are provided which are disposed between the washers of the bolts and the platen in the bores and are slightly longer than the thickness of the webs in this area so that a small gap is defined between the platen and the connection piece. When the nozzle contact pressure is conducted across the sprue bush and the fixed half of the injection mold into the fixed platen, the connection piece can deform and slightly tilt relative to the platen. As the ball screw-shaft is disposed below the plasticizing cylinder, the latter can be laterally swing via a rotary pin. As an alternative to both webs, the connection piece may also include a vertical piece with a ring, wherein the ring surrounds the nozzle through travel opening in the platen. The ring is loosely secured to the fixed platen in a same manner as the two webs.

This type of nozzle contact device has the drawback that the loose connection between the connection piece and the platen is relatively difficult to implement. The gap between the connection piece and the platen as well as the gap between the sleeve and the bore may not be adjusted too small, on one hand, in order to ensure a sufficient tilting of the connection piece; on the other hand, this gap mass may not be adjusted too great. As it is also desirable to locate the bolted connection of the connection piece as close as possible to the nozzle through travel opening, different connection pieces are to be provided for various diameters of the nozzle through travel opening.

It would therefore be desirable and advantageous to provide an improved nozzle contact device to obviate prior art shortcomings and to avoid the introduction of bending moments into the fixed half of the injection mold or into the injection unit.

SUMMARY OF THE INVENTION

According to one aspect of the present invention, a nozzle contact device for guiding and pressing an injection nozzle of an injection unit of an injection molding machine against an injection mold, includes a linear drive, and a guide carriage operatively connected to the linear drive for moving the injection unit in a direction of an injection mold for injection of material along an injection axis from an injection nozzle into the injection mold, said guide carriage being articulated to the injection unit for rotation about a horizontal axis of rotation, wherein the axis of rotation and the injection axis extend on horizontal planes in parallel relationship to one another.

The present invention resolves prior art problems by providing a guide carriage which can be operated by a linear drive, for example a screw mechanism, and with which the injection unit with the injection axis is horizontally articulated, the guide carriage may be deformed or tilted as a result of the nozzle contact pressure; However, the mentioned articulation between injection unit and guide carriage prevents a transfer of this deformation or tilting onto the injection unit. Thus, despite the asymmetric force introduction, there is no change in the vertical disposition of the nozzle. The articulation may suitably lie on the same horizontal plane as the injection axis.

Using eccentric bolts for the articulation allows height variation of the plasticizing cylinder in relation to the machine bed. When, in addition, the screw mechanism is also height-adjustable, the entire injection unit may be aligned precisely in relation to the sprue bush of the injection molding.

The linear drive may be a spindle drive, for example comprised of a rotating ball screw and a non-rotating ball nut on the guide carriage. Advantageously, a spring plate may be articulated on the guide carriage in relation to the spindle drive.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
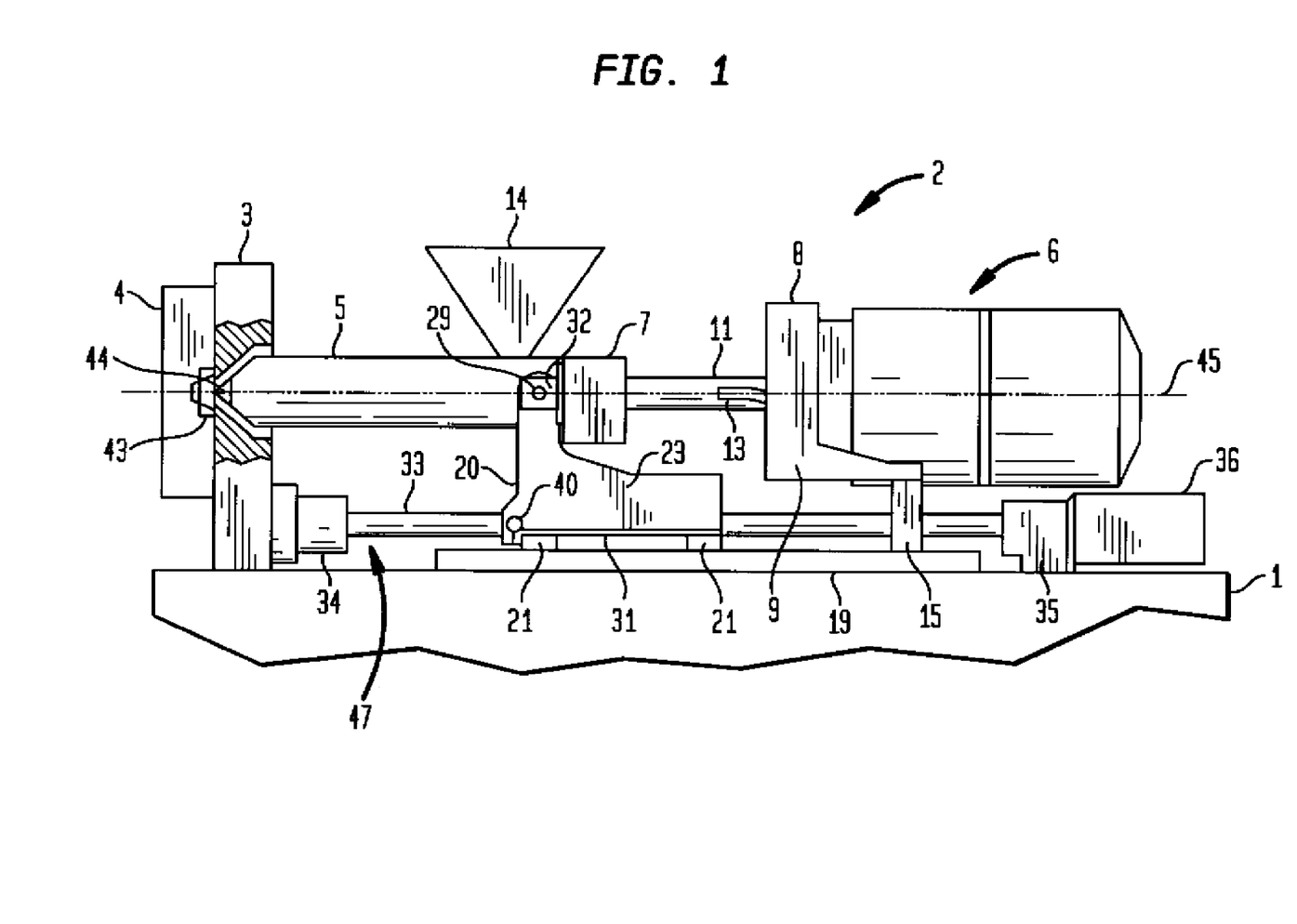
FIG. 1 is a side view of an injection unit with nozzle contact device according to the invention.
Figure 2:
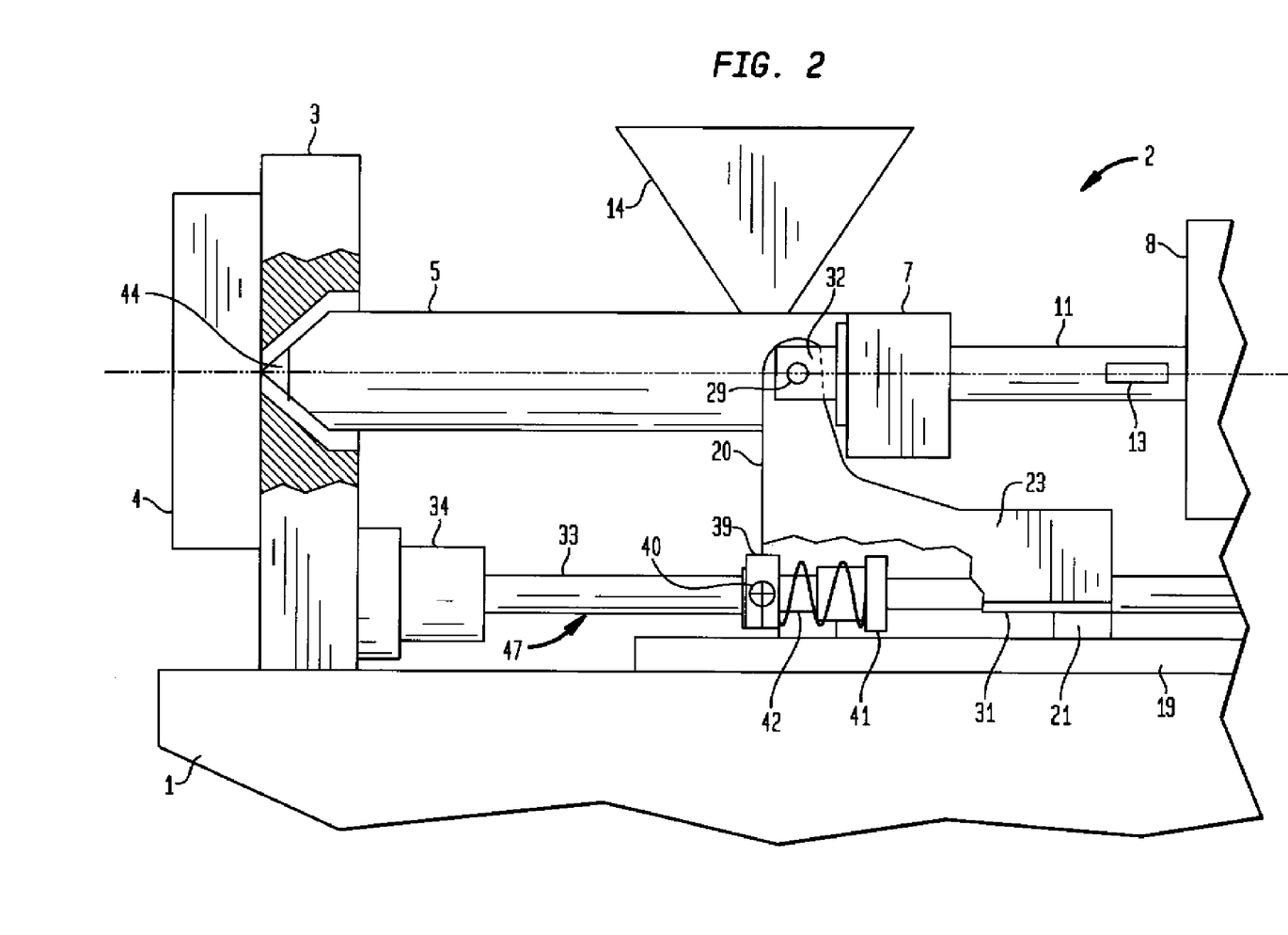
FIG. 2 is a detailed cutaway view, on an enlarged scale, of the injection unit of FIG. 1 in the area of a guide carriage.

Turning now to the drawing, and in particular to FIGS. 1 and 2, there is shown a machine bed 1 of an injection molding machine for support of an injection unit 2 as well as a fixed platen 3 with a fixed mold half 4. For sake of simplicity, the remaining parts of the clamping unit are not depicted as they are known per se and not required for the understanding of the invention. A screw (not illustrated here) is accommodated in a plasticizing cylinder 5 of the injection unit 2 and driven for rotation and longitudinal displacement by means of a screw mechanism 6. Introduction of plastic pellets is realized via a feed hopper 14. The plasticizing cylinder 5 defines an injection axis 45 and has a rear zone provided on the left and right with fastening tabs 32, each having an outer part and an inner part between which a gap is defined, and is articulated there to a guide carriage 20 which projects into the gap. The screw has a rear end supported in a bearing device 7, and the screw mechanism 6 is bolted in a ring 8 having lateral extensions 9 and 10.

Figure 3:
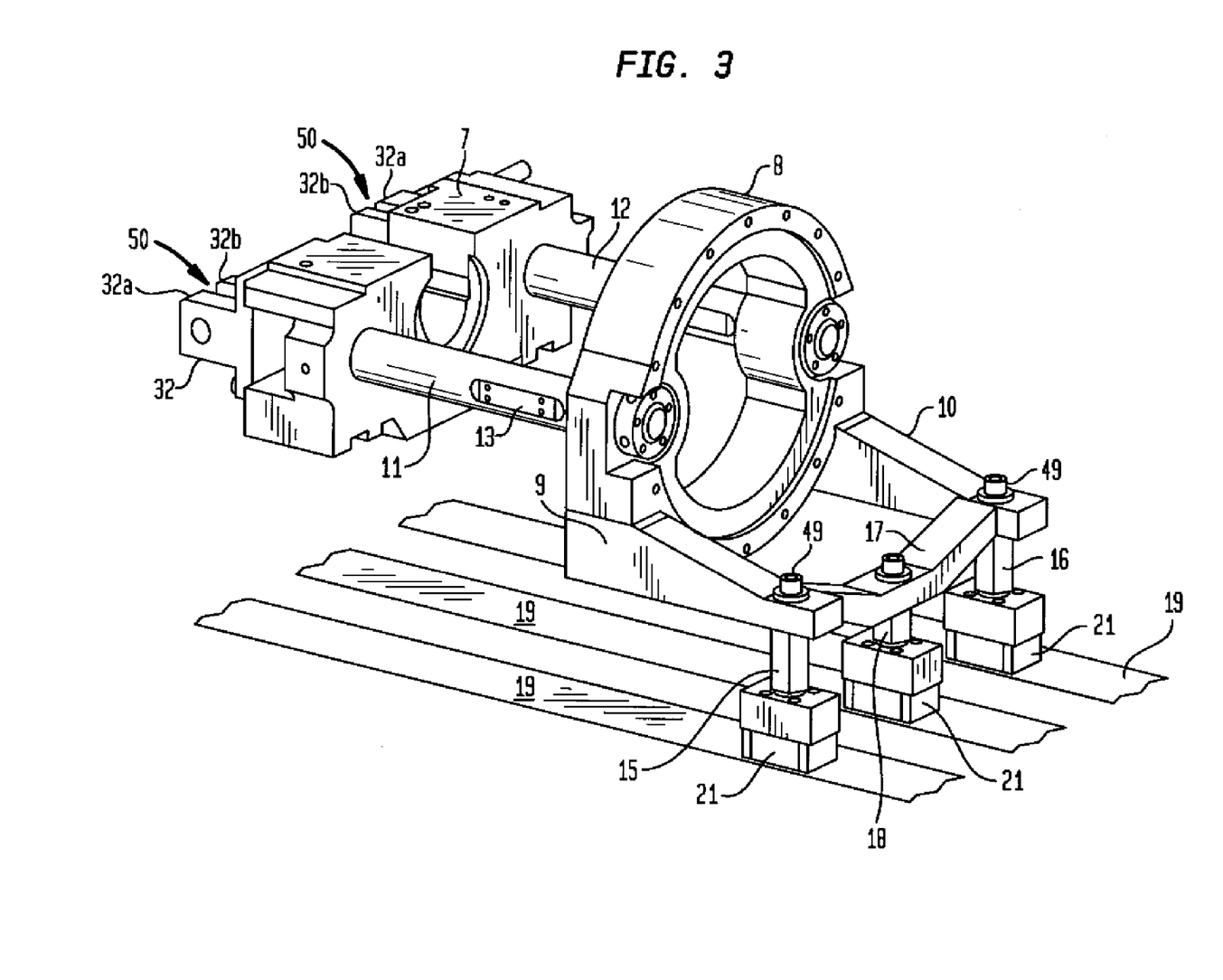
FIG. 3 is a perspective view of the injection unit, depicting a suspension for a screw mechanism for operating a screw.
Figure 4:
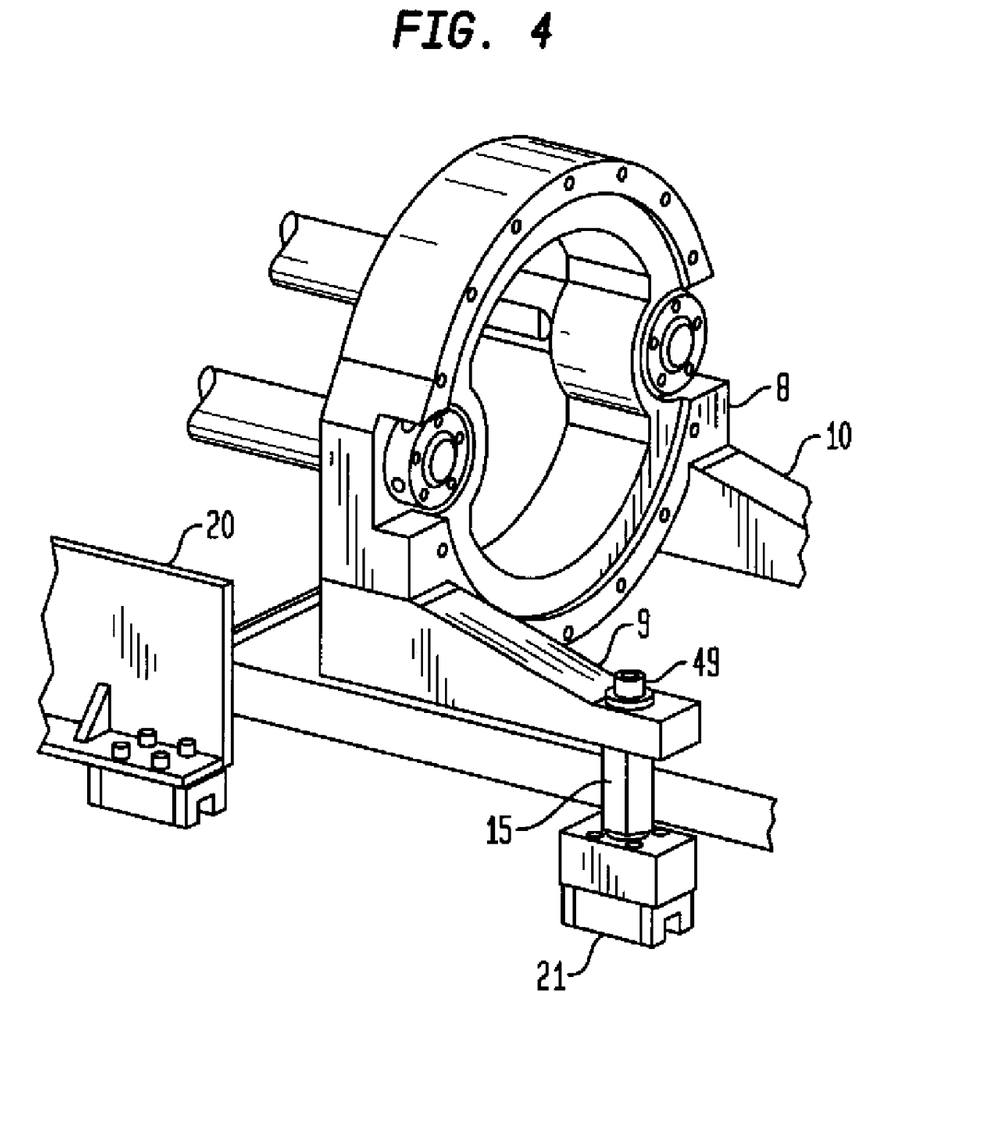
FIG. 4 is a perspective view of a height-adjusting device for the screw mechanism.
Figure 5:
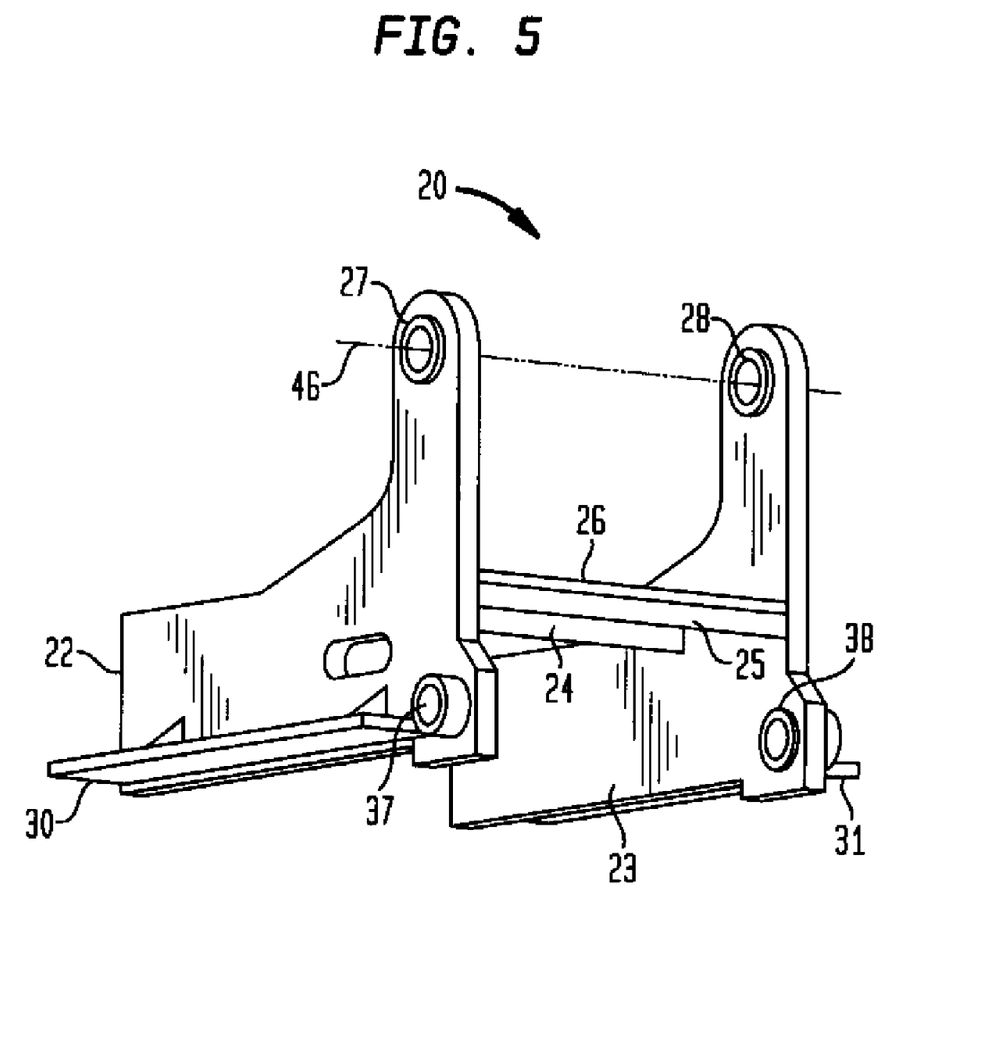
FIG. 5 is a perspective view of the guide carriage welded together from several parts.

In combination with FIGS. 3 and 4, the support of the screw mechanism on the machine bed 1 shall be described in more detail. This support is implemented via carrier elements 15 and 16 on the rear end of the lateral extensions 9 and 10 which are longitudinally movable by means of sliding shoes 21 on a linear guide 19. Optionally, a crossbar 17 may be provided between both extensions and additionally supported by the machine bed 1 via a further carrier element 18 on an additional linear guide. When using a crossbar 17, the lateral carrier elements 15 and 16 may also be omitted. The carrier elements 15 and 16 have here a height-adjusting device so that the screw mechanism 6 can be height-adjustable. For example, the carrier elements 15 and 16 are each configured as hexagon bolts with following threaded portion. The lateral extensions 9 and 10 are provided in this area with a fitting internal thread. Thus, as the hexagon bolt rotates, the respective extension moves upwards or downwards depending on the rotation direction. The hexagon bolts may simply rest on the sliding shoes 21, for example. A locking nut 49 is provided to secure the adjusted height. If need be, the carrier elements 15 and 16 may also be configured for longitudinal displacement in relation to the extensions 9 and 10, as indicated in FIGS. 3 and 4 by the broken line on the extensions 9 and 10. Thus, the screw mechanism may be propped at different positions in length direction of the machine. For example, when considering motors of different weight for the screw mechanism, the position of the carrier elements 15 and 16 may be adjusted to the different positions of the centers of gravity of these different motors. Two columns 11 and 12 extend to the left and right of the unillustrated screw driveshaft between the bearing device 7 of the screw and the ring 8 for the assembly of the screw mechanism, and have strain gauges 13 attached thereto to determine the pressure in the screw end chamber as a result of a change in length. In the plasticizing phase, this change in length is a measure for the back pressure, and in the injection phase a measure for the injection force. The fastening tabs 32 for the articulated support of the guide carriage are attached in injection direction before the bearing device 7 on both sides of the injection axis 45. These fastening tabs 32 have each an outer part 32a and an inner part 32b, between which a gap 50 is respectively defined for receiving the vertical parts of the guide carriage 20 and which have bores 51 for receiving the rotary pin 29 defined by an axis of rotation 46 (FIG. 5).

As can further be seen from FIGS. 1 and 2, a linear drive 47, here a screw mechanism, is provided for moving the injection unit 2 back and forth. The central ball-screw shaft 33 has a mold-proximal end which is supported in a bearing device 34 on the fixed platen 3 in an axially fixed but rotatable manner. With the opposite end thereof, the ball-screw shaft 33 is also supported in an axially fixed but rotatable manner in a bearing device 35 on the machine bed 1. The ball-screw shaft 33 is coupled in fixed rotative engagement with the rotor of an electric motor 35 and can be caused to rotate by the electric motor. A ball nut 41 is secured to the guide carriage 20 for converting the rotation of the ball-screw shaft 33 into an axial motion of the guide carriage 20 and thus of the injection unit 2.

Figure 6:
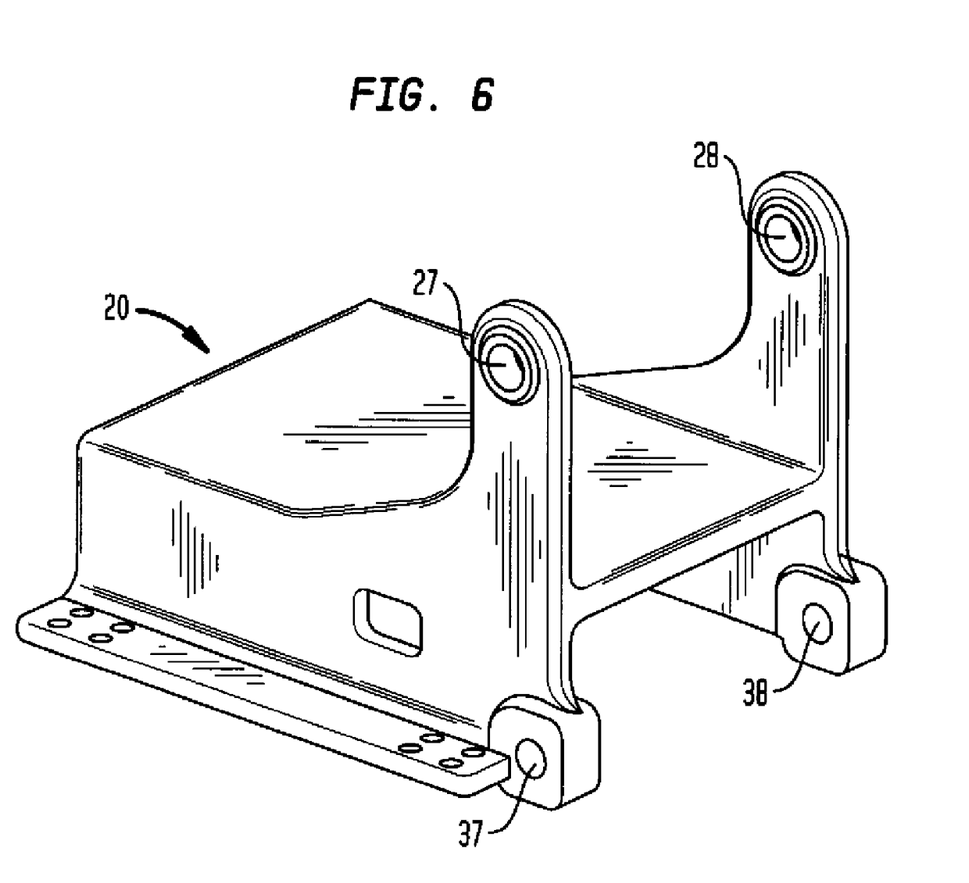
FIG. 6 is a perspective view of the guide carriage in the form of a single-piece casting.

Constructive details of the guide carriage 20 as well as its connection to the linear drive 47 and to the injection unit shall now be described in more detail with reference to FIGS. 5 and 6, whereby additional reference is made to FIGS. 1 to 3 for better understanding of the connection between the guide carriage and the linear drive 47 and guide carriage 20 and injection unit 2, respectively. The guide carriage 20 has a lower area provided with horizontal side pieces 30 and 31 which can be bolted to sliding shoes 21 which in turn are in engagement with the rail of the linear guide 19 so that the guide carriage 20 is supported for longitudinal displacement on the machine bed 1. The guide carriage 20 further includes two vertical plates 22 and 23 which are interconnected via one or more support struts 24 and 25 and, optionally, a horizontal support plate 26. In the area of articulation with the plasticizing cylinder 5, the vertical plates 22 and 23 have bores 27 and 28 for receiving the rotary pins. Only the left rotary pin 29, which is received in the bore 28, is visible in FIGS. 1 and 2. Furthermore, the plates 22 and 23 include bores 37 and 38 on a plane with the ball-screw shaft 33 for receiving rotary pins for a hinged support of a spring plate 39. In FIGS. 1 and 2, only the left rotary pin 40, which is received in the bore 31, is visible. As can be seen from FIGS. 1 and 2, the ball nut 41 of the screw mechanism is non-rotatably fixed to the guide carriage 20. A helical spring 42 is disposed between the spring plate 40 and the ball nut 41. When the ball-screw shaft 33 is caused to rotate by the electric motor 36, the ball nut 41 moves in FIGS. 1 and 2 to the left or to the right depending on the rotation direction. When moving to the left, the injection unit 2 moves toward the platen 3 until the injection nozzle 44 bears upon the sprue bush 43. A continued rotation of the ball-screw shaft 33 causes the ball nut 41 to compress the helical spring 42, and the injection nozzle 44 is firmly pressed against the sprue bush 43. The guide carriage may be configured as welded construction (see FIG. 5) or in one piece as casting (see FIG. 6).

The nozzle contact force can be adjusted via the spring constant and the spring excursion and is introduced via the guide carriage 20, free of a bending moment, directly at level with the injection axis 45 (and thus through the plane of the plasticizing cylinder) into the injection unit 2. This also ensures that the tie rods 11 and 12 are exposed to tensile stress only and not to a bending force. As a result, the measurement of the melt pressure in the screw end chamber by means of the strain gauges 13 for determination of the back pressure and/or the injection force is not falsified during the length extension of the tie rods.

Figure 7:
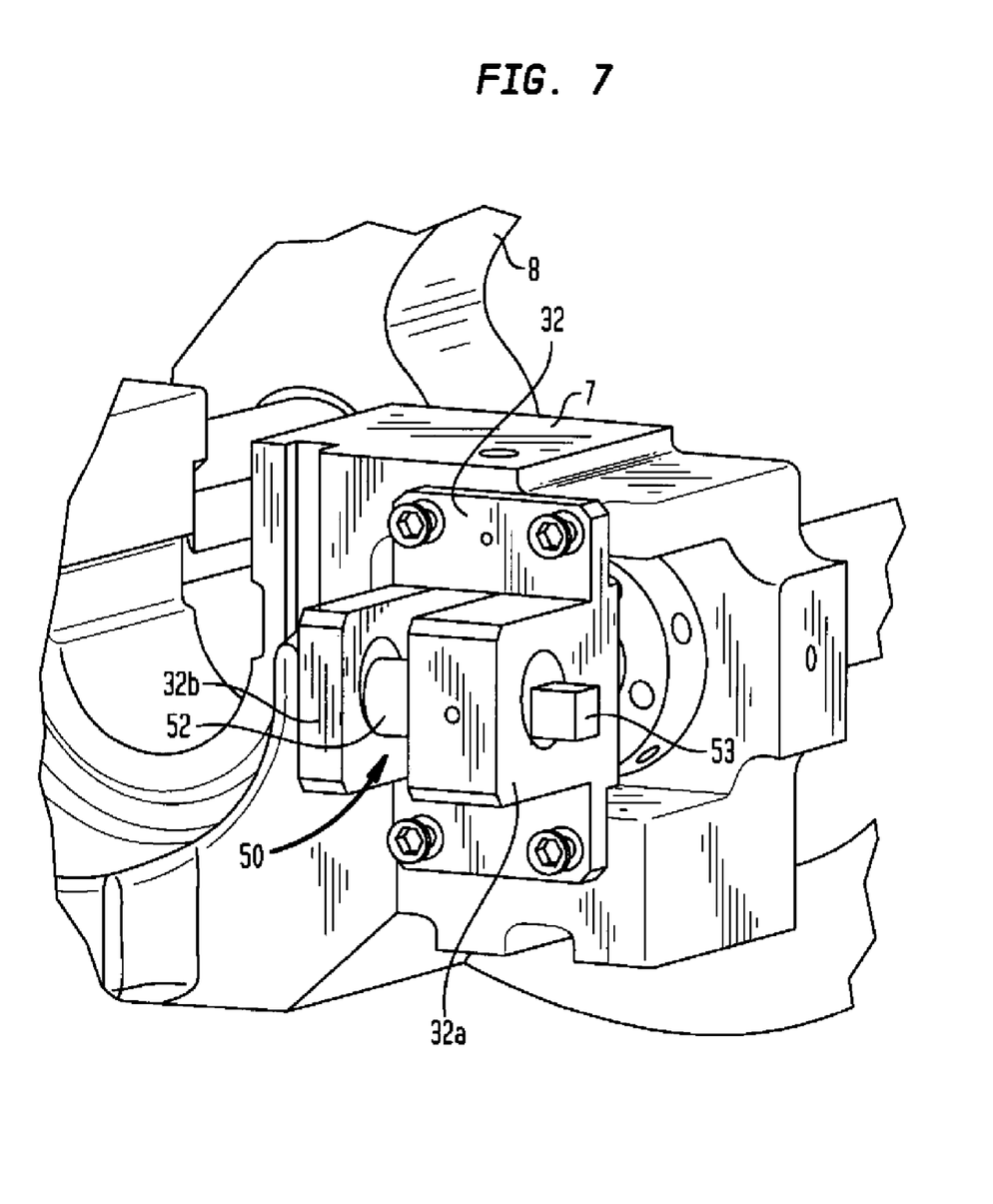
FIG. 7 is a perspective view of a variation of a nozzle contact device according to the present invention, depicting an articulated connection with eccentric bolt for the guide carriage.

Eccentric bolts 52 may also be provided as rotary pins for the articulation between guide carriage 20 and plasticizing cylinder 5 and/or guide carriage 20 and spring plate 39, as shown in FIG. 7. For ease of illustration, the vertical plate of the guide carriage 20 for projection into the gap 50 between the outer part 32*a* and the inner part 32*b* of the fastening tab 32 is not shown in FIG. 7. Adjustment of the eccentric bolt 52 through rotation of the square head 53 allows height variation of the plasticizing cylinder 5 in relation to the machine bed 1. In order to attain a same rotation of the eccentric bolt 52 on both sides of the injection axis 45, a U-shaped bracket, which embraces the plasticizing cylinder 5, may be provided for example, with the ends of the U having each an opening for embracing the square head 53.

By means of the rotary pins, on one hand, and here in particular also the eccentric bolts, and the height-adjusting bolts on the screw mechanism, on the other hand, the precise position of the plasticizing cylinder 5 can be adjusted in relation to the mold 4 so that the nozzle 44 accurately bears in the sprue bush 43. Then, a sufficient nozzle contact pressure can also be applied. Moreover, large nozzle bore cross sections may be provided. Furthermore, there are no limitations with respect to nozzle construction and useable materials.

The articulated support results in an introduction of the nozzle contact pressure, free of bending moment, into the mold. The position of the nozzle can be adjusted accurately and rapidly. Since, moreover, no bending moment is introduced into the plasticizing cylinder, there is no danger of rupture of the plasticizing screw or an increased friction between the plasticizing screw and the inside wall of the plasticizing cylinder.

Figure 8:
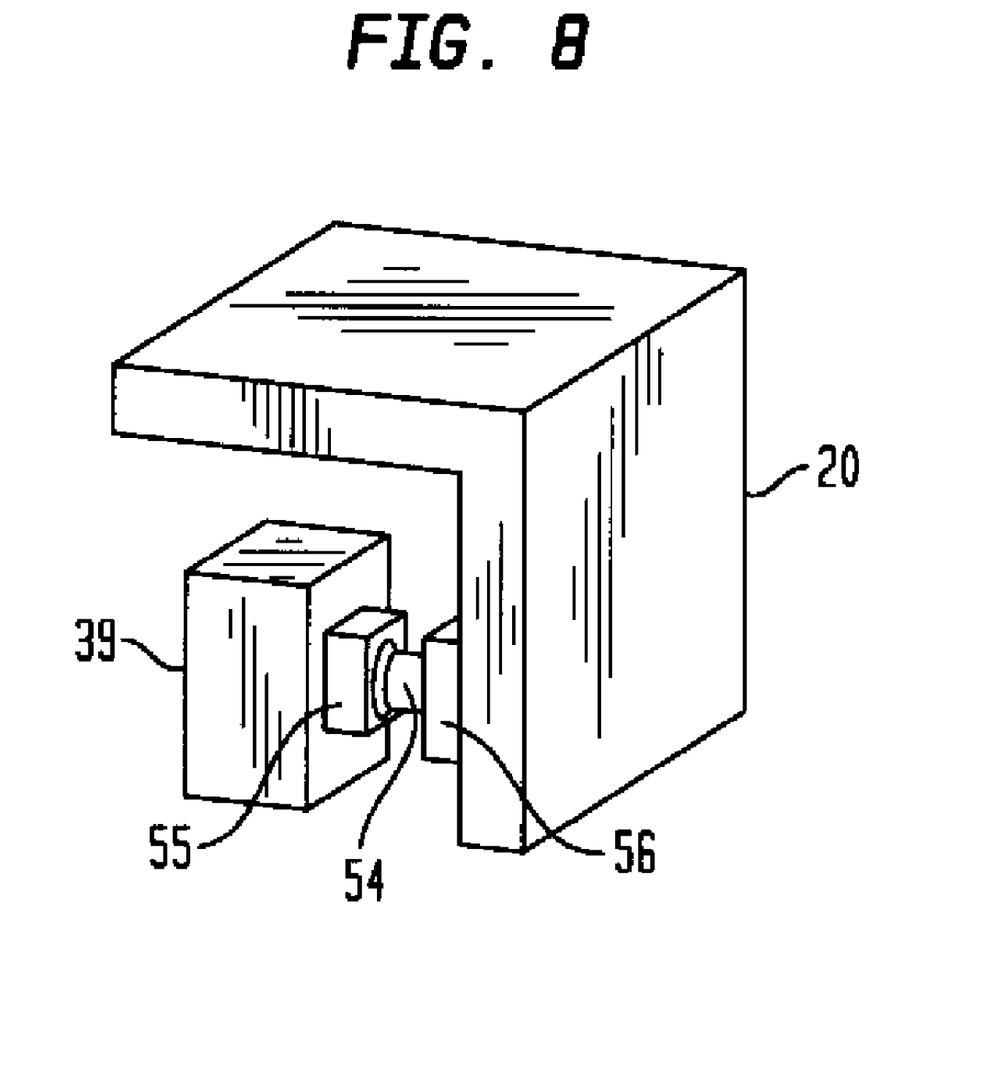
FIG. 8 is a perspective view of a bending joint for realizing an articulation between the guide carriage and a ball screw mechanism.

Since only slight movements with small angles of rotations are encountered in the rotary joints of the guide carriage, it is also possible to use a bending joint instead of the rotary joint. The term "bending joint" relates hereby to an elastically deformable machine element which is provided between the guide carriage and the plasticizing cylinder and/or between the guide carriage and the spring plate. By way of example, FIG. 8 shows the use of a torsion rod 54 having end pieces 55 and 56 for securement to the guide carriage 20, on one hand, and to the spring plate 39, on the other hand. The torsional elasticity of the torsion rod 54 is so selected as to allow little rotation between the spring plate 39 and the guide carriage 20. The bending joint may, however, also be an integral part of the guide carriage.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A nozzle contact device for guiding and pressing an injection nozzle of an injection unit of an injection molding machine against an injection mold, comprising:
   a linear drive; and
   a guide carriage articulated to the linear drive and directly operated by the linear drive for moving the injection unit in a direction of an injection mold for injection of material along an injection axis from an injection nozzle into the injection mold, said guide carriage being articulated to the injection unit for rotation about a horizontal axis of rotation, wherein the axis of rotation and the injection axis extend on horizontal planes in parallel relationship to one another,
   wherein the linear drive includes an axially fixed but rotatably supported screw shaft, and a screw nut secured non-rotatably to the guide carriage, further comprising a spring plate, which is articulated to the guide carriage and restrained against rotation in relation to the linear drive, and at least one spring arranged between the ball nut and the spring plate.

2. The device of claim 1, wherein the injection axis and the axis of rotation extend on a same horizontal plane.

3. The device of claim 1, wherein the guide carriage is articulated to the injection unit via two hinge joints disposed on both sides of the injection axis.

4. The device of claim 1, wherein the guide carriage is articulated to the injection unit by a rotary joint having an eccentric bolt to allow vertical adjustment of the injection unit in relation to a machine bed.

5. The device of claim 1, wherein the screw shaft is a ball-screw shaft, and the screw nut is a ball nut.

6. The device of claim 1, wherein the guide carriage includes two vertical plates extending to the left and right of the injection axis and moveably supported on guide rails, said vertical plates being interconnected by a support plate and/or support struts, disposed below the injection axis.

7. The device of claim 1, wherein the guide carriage is constructed in one piece as casting having two vertical components extending to the left and right of the injection axis and interconnected by a horizontal component below the injection axis.

8. The nozzle contact device of claim 1 further comprises a height-adjusting device provided below the injection unit for adjusting a height of the linear drive.

9. The device of claim 8, wherein the height-adjusting device includes a height-adjusting screw.

10. The device of claim 8, wherein the guide carriage is articulated to the injection unit at a location between a position of the height-adjusting device and a forward end of the injection unit.

11. The device of claim 10, wherein the guide carriage is articulated to the injection unit in an area of a plasticizing cylinder, and that the height-adjusting device is arranged below a screw mechanism for operating a screw in the plasticizing cylinder.

12. The device of claim 10, wherein the guide carriage is articulated to the injection unit in an area of a rear end of the plasticizing cylinder.

13. The device of claim 12, wherein the screw mechanism is supported on a crossbar moveable on a machine bed, said height-adjusting device being provided on the crossbar.

14. The device of claim 11, further comprising a mounting frame having two extensions extending on both sides of the screw mechanism, said screw mechanism being secured to the mounting frame, wherein at least one of the extensions is vertically adjustable by a height-adjusting device.

15. The device of claim 14, wherein the height-adjusting device is constructed for longitudinal movement in relation to the extension.

16. The device of claim 1, wherein the guide carriage is articulated to a plasticizing cylinder of the injection unit by a bending joint.

17. The device of claim 1, wherein the guide carriage is articulated to the linear drive by a bending joint.

* * * * *